US010664522B2

(12) United States Patent
Dechu et al.

(10) Patent No.: US 10,664,522 B2
(45) Date of Patent: May 26, 2020

(54) INTERACTIVE VOICE BASED ASSISTANT FOR OBJECT ASSISTANCE

(71) Applicant: International Business Machines Corporation, Armonk, NY (US)

(72) Inventors: Sampath Dechu, Hyderabad (IN); Neelamadhav Gantayat, Bangalore (IN); Pratyush Kumar, Chennai (IN); Senthil Kumar Kumarasamy Mani, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 169 days.

(21) Appl. No.: 15/834,420

(22) Filed: Dec. 7, 2017

(65) Prior Publication Data
US 2019/0179959 A1    Jun. 13, 2019

(51) Int. Cl.
| | |
|---|---|
| G06F 7/00 | (2006.01) |
| G06F 16/00 | (2019.01) |
| G06F 16/783 | (2019.01) |
| G06F 9/451 | (2018.01) |
| G06F 16/74 | (2019.01) |
| G06F 16/68 | (2019.01) |
| G06F 40/205 | (2020.01) |

(52) U.S. Cl.
CPC .......... *G06F 16/7834* (2019.01); *G06F 9/453* (2018.02); *G06F 16/68* (2019.01); *G06F 16/743* (2019.01); *G06F 40/205* (2020.01)

(58) Field of Classification Search
None
See application file for complete search history.

(56) References Cited

U.S. PATENT DOCUMENTS

| | | | |
|---|---|---|---|
| 2004/0138899 A1* | 7/2004 | Birnbaum | G06Q 10/10 704/231 |
| 2014/0012626 A1 | 1/2014 | Ajmera et al. | |
| 2016/0314627 A1* | 10/2016 | Fish | G07C 5/008 |

(Continued)

OTHER PUBLICATIONS

Banovic, Nikola et al., "Waken: Reverse Engineering Usage Information and Interface Structure from Software Videos", UIST '12, Oct. 7-10, 2012, Cambridge, Massachusetts, USA, 10 pages, ACM Digital Library.

*Primary Examiner* — Tuan A Pham
(74) *Attorney, Agent, or Firm* — Ference & Associates LLC

(57) ABSTRACT

One embodiment provides a method, including: utilizing at least one processor to execute computer code that performs the steps of: using an electronic device to engage in an interactive session between a user and a virtual assistant; receiving, at the electronic device, audio input from the user, wherein the audio input comprises a problem-solving query corresponding to a request by the user for assistance in solving a problem related to at least one object; parsing the audio input to identify at least one annotated video file corresponding to the at least one object and the problem-solving query; determining a state of the object and a location in the at least one annotated video file corresponding to the state of the object; and providing, to the user and based on the location in the at least one annotated video file, instructional output related to the problem-solving query.

15 Claims, 2 Drawing Sheets

(56) References Cited

U.S. PATENT DOCUMENTS

2017/0017635 A1      1/2017   Leliwa et al.
2017/0185375 A1*     6/2017   Martel .................... G06F 3/167
2017/0293610 A1*    10/2017   Tran ...................... G06F 17/279
2017/0323641 A1*    11/2017   Shimizu .................. B60R 16/02

* cited by examiner

INTERACTIVE VOICE BASED ASSISTANT FOR OBJECT ASSISTANCE

BACKGROUND

On a daily basis users frequently encounter and interact with a variety of mechanical and/or electronic devices ("devices"), for example, laptop and personal computers, tablet devices, smart phones, televisions, household appliances (e.g., washing machines, drying machines, etc.), and the like. Users often require help installing, operating, or troubleshooting these devices. A user may seek out the information they need to address their device-related query from a variety of different sources. For example, a user may read an instructional manual associated with the relevant device, a user may watch an instructional video associated with the relevant device and/or the relevant issue, a user may call into a call-center to obtain assistance from another individual, and the like.

BRIEF SUMMARY

In summary, one aspect of the invention provides a method, comprising: utilizing at least one processor to execute computer code that performs the steps of: using an electronic device to engage in an interactive session between a user and a virtual assistant; receiving, at the electronic device, audio input from the user, wherein the audio input comprises a problem-solving query corresponding to a request by the user for assistance in solving a problem related to at least one object; parsing the audio input to identify at least one annotated video file corresponding to the at least one object and the problem-solving query; determining a state of the object and a location in the at least one annotated video file corresponding to the state of the object; and providing, to the user and based on the location in the at least one annotated video file, instructional output related to the problem-solving query.

Another aspect of the invention provides an apparatus, comprising: at least one processor; and a computer readable storage medium having computer readable program code embodied therewith and executable by the at least one processor, the computer readable program code comprising: computer readable program code configured to engage in an interactive session between a user and a virtual assistant; computer readable program code configured to receive audio input from the user, wherein the audio input comprises a problem-solving query corresponding to a request by the user for assistance in solving a problem related to at least one object; computer readable program code configured to parse the audio input to identify at least one annotated video file corresponding to the at least one object and the problem-solving query; computer readable program code configured to determine a state of the object and a location in the at least one annotated video file corresponding to the state of the object; and computer readable program code configured to provide, based on the location in the at least one annotated video file, instructional output related to the problem-solving query.

An additional aspect of the invention provides a computer program product, comprising: a computer readable storage medium having computer readable program code embodied therewith and executable by the at least one processor, the computer readable program code comprising: computer readable program code configured to engage in an interactive session between a user and a virtual assistant; computer readable program code configured to receive audio input from the user, wherein the audio input comprises a problem-solving query corresponding to a request by the user for assistance in solving a problem related to at least one object; computer readable program code configured to parse the audio input to identify at least one annotated video file corresponding to the at least one object and the problem-solving query; computer readable program code configured to determine a state of the object and a location in the at least one annotated video file corresponding to the state of the object; and computer readable program code configured to provide, based on the location in the at least one annotated video file, instructional output related to the problem-solving query.

A further aspect of the invention provides a method, comprising: utilizing at least one processor to execute computer code that performs the steps of: engaging, at an electronic device, in an interactive session between a user and a virtual assistant, wherein the interactive session comprises at least one input provided by the user and at least one corresponding query output provided by the digital assistant; receiving, as part of the at least one input, an audible problem-solving query from the user, wherein the audible problem-solving query comprises a request to troubleshoot a problem related to an electronic device; accessing a database comprising a plurality of annotated video files; determining, by analyzing audio corresponding to the audible problem-solving query, a point in at least one of the plurality of annotated video files corresponding to the audible problem-solving query and a state of the electronic device; and providing, based on the point in the at least one annotated video file, the at least one corresponding query output, wherein the at least one corresponding query output comprises instructional output related to the problem-solving query.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
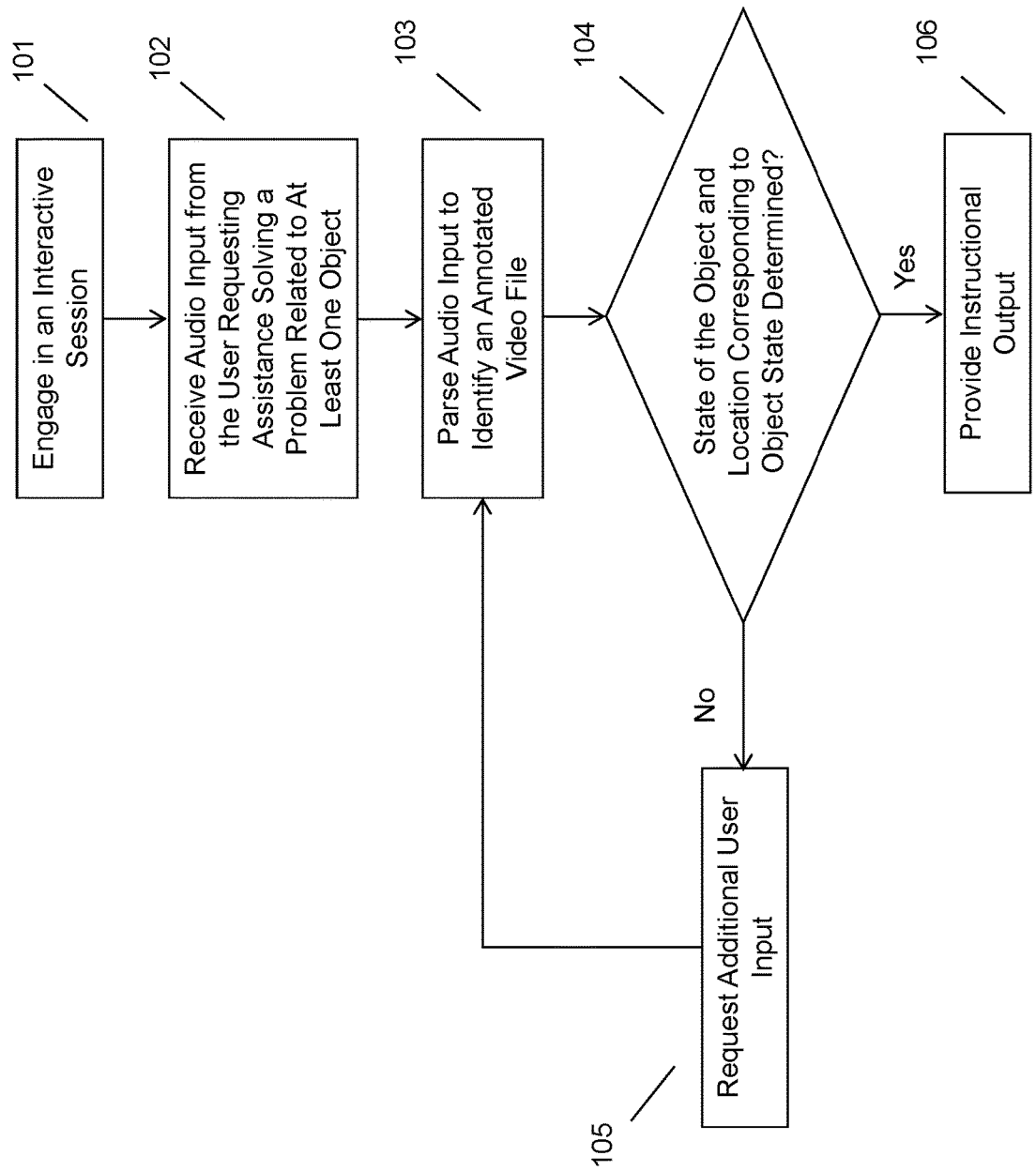
FIG. 1 illustrates an example method of providing instructional output related to a problem-solving query.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-2. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 2. In accordance with an example embodiment, all of the process steps, components and outputs discussed with respect to FIG. 1 can be performed or utilized by way of a processing unit or units and system memory such as those indicated, respectively, at 16' and 28' in FIG. 2, whether on a server computer, a client computer, a node computer in a distributed network, or any combination thereof.

Conventionally, a common way for a user to obtain information regarding a device-related query (e.g., a query regarding how to install, operate, or fix an issue with a device, etc.) is to contact a customer support center and speak to a customer support representative who may be able to provide the user with the information he or she needs. As technology has progressed, robots ("bots") have become more prevalent in these support centers. These bots may interact with a user through voice (e.g., telephonically, etc.) and/or visually through a user interface (e.g., pictures and/or text on a display screen, etc.). For example, a banking customer may interact with an interactive bot to reset his or her ATM pin by receiving predetermined queries from the bot and thereafter providing corresponding vocal inputs until their ATM pin is reset.

These conventional methods, however, have several drawbacks. For one, the effort needed to document each and every step of using a mechanical or computing device is a tedious process. Additionally, if a user has a device-related query that is unrecognizable to the bot, or has provided input that is unrecognizable to the bot, then the bot may not be able to provide relevant, informative output because the bot's responses are tied to a predetermined script. Furthermore, bots that provide visual informative output (e.g., using pictures and/or animations of content display on a display screen, etc.) may not be any help to users who are interacting with a device that does not have a display screen (e.g., a smart speaker, etc.) or where the user is in a situation where they cannot look at a display screen on the device.

Accordingly, the techniques and systems as described herein provide a method of auto-generating an interactive voice-enabled agent to help users troubleshoot, operate, or otherwise interact with a mechanical or computing device. The system may engage in an interactive session between a user and a virtual assistant. The interactive session may comprise a series of outputs provided by the virtual assistant and a series of corresponding inputs provided by the user. As such, the interactive session may resemble a conversation between the user and the virtual assistant. The system may receive audio input from the user comprising a problem-solving query that corresponds to a request by the user for assistance in solving a problem related to an object (e.g., how to install, operate, or use an electronic or mechanical device, how to create a product, etc.). The system may parse the audio input (e.g., using conventional audio analysis techniques, etc.) to identify an annotated video file that corresponds to the object and the problem-solving query.

The system may thereafter determine a state of the object and a location in the annotated video file corresponding to the state of the object. For example, if an electronic device (e.g., a washing machine, etc.) has two of three available lights blinking a blue color, then a system may be able to identify that a washing machine with those two lights blinking a blue color corresponds to a door-jam state and may access an annotated video file corresponding to how to resolve the door-jam situation. Responsive to identifying the location in the annotated video file that the state of the object corresponds to, the system may provide instructional output related to the problem-solving query from that point.

The instructional output may comprise a series of outputs provided by the virtual assistant and responsive inputs provided by the user that allow the system to identify whether the object state of the user's object matches an object state of an object in the annotated video file. Such a method may enable a virtual assistant to provide the user with instructional output capable of resolving the user's problem-solving query. Additionally, such a method may enable a system to identify new object states of a user's object as steps corresponding to the instructional output are followed by the user.

Referring now to FIG. 1, the system may activate a virtual assistant capable of recognizing a situation associated with a user's problem-solving query and thereafter provide the user with instructional output responsive to their query by accessing and utilizing annotated video files. At 101, the system may engage, at an electronic device, in an interactive session with a user. The electronic device may be any electronic device capable of receiving audible inputs provided by a user such as a cell phone, a smart phone, a smart speaker, a laptop or personal computer, and the like. Additionally, the electronic device may be a predominately voice-only device, for example, without a display screen (e.g., a smart speaker).

Initiating the interactive session may be completed using a variety of techniques. For example, the user may provide explicit activation input (e.g., a hard or soft button press on the electronic device, providing an activation gesture, providing an activation voice input, etc.), through implicit input from the user (e.g., a user making a call into a customer service center that connects to a virtual assistant, etc.), and the like.

The interactive session may include a session where the user interacts with a virtual assistant in a series of inputs and outputs provided by both the user and the virtual assistant. The interactive session may resemble a conversation between a user and the virtual assistant where the user provides an input and the virtual assistant provides an output responsive to the provided input. Additionally, the virtual assistant may provide output and the user may respond to the output of the virtual assistant. Thus, the system may engage in the interactive session using a virtual assistant capable of receiving and processing audible user inputs (e.g., at a microphone of the electronic device, another audio input device, etc.) and thereafter providing responsive audible outputs (e.g., using a speaker of the electronic device, another audio output device, etc.). The virtual assistant may be disposed locally on the electronic device or may be disposed on another electronic device in communication with the electronic device, for example, on a cloud device that is accessible by the local device.

At 102, the system may receive, at the electronic device, audio input from the user. The audio input may comprise a problem-solving query corresponding to a request by the user for assistance in solving a problem related to at least one object (e.g., how to install, operate, or use an electronic or mechanical device, how to create a product, etc.). The object may be an electronic or mechanical device (e.g., a smart phone, a television, an appliance, a piece of furniture, etc.) or a portion thereof (e.g., an active application on a smart phone, etc.). Alternatively, the object may be a product a user is trying to create. For example, a user may be having difficulty constructing an object (e.g., a table, a bed frame, etc.) or completing a recipe. Additionally or alternatively, the problem-solving query may comprise a request, from the user, to troubleshoot a problem related to an electronic device. For example, the electronic device may be malfunctioning and the user may request assistance in troubleshooting the electronic device.

As a working example that will be used here throughout, the user may be trying to access an Internet site on a smart phone. However, the smart phone may indicate that it is unable to connect to the Internet. Accordingly, the user may call or otherwise access a virtual assistant to assist in troubleshooting and fixing the problem. When the user engages in the interactive session, the user may provide a description of the issue with the smart phone, specifically that the user is unable to connect to an Internet site with the smart phone.

At 103, the system may parse the audio input to identify at least one annotated video file corresponding to the object and the problem-solving query. The system may parse the audio input utilizing one or more conventional speech analysis techniques that are capable of parsing and/or identifying individual words in the audible speech. In a first step, the virtual assistant uses the parsed audio input to identify the object related to the problem-solving query and a state of the object. The state of the device refers to the current condition of the object, for example, any visual indicators and the condition of the visual indicators, a current screen of a device, the condition of parts of the object, and the like. In other words, the virtual assistant is attempting to determine what the user is seeing as the user looks at the object.

In order to determine the state of the object, the parsed speech may be used to identify a relevant annotated video file. The annotated video file may be a video file related to the object and contain annotations that identify objects present in the video, actions taken by users in the video, conditions of different parts of the object, and the like. Using our working example, the video file may include a video related to the particular smart phone that the user is using and may also be related to connecting to an Internet site with that particular device. The annotations may include identifications of different screen indicators (e.g., each icon, each hard/soft button, etc.), an identification of the state of the difference screen indicators (e.g., red means off, this icon represents a particular mode, etc.), an identification of user actions taken to achieve a desired screen, and the like. The annotations may be made for each frame of the video or may simply be based upon a single frame or screen. The video file may be annotated manually (e.g., by a user, etc.) or may be automatically annotated (e.g., using one or more object and/or action identification techniques, etc.). The annotations may or may not be visible to a user.

The identification of an annotated video file that relates to a user's problem-solving query may be conducted, for example, by matching words parsed from the user's audible input to annotations associated with a video file. For example, each word in the user-provided audible input "How do I connect to the Internet?" may be parsed and used, in whole or in part, as a search term(s) against a database comprising a plurality of annotated video files. An instructional video corresponding to the connecting to the Internet on a user's electronic device may be matched to the query because a number of the terms in the audible input match objects present in the annotations of the video file.

In some situations, a system may identify more than one annotated video file that matches the parsed user input. In such a situation, a system may select one of the plurality of annotated video files using a predetermined rule set. For example, the system may select the annotated video file having the most matched terms with the parsed input. Additionally or alternatively, if two annotated video files have the same amount of matched terms, the system may select the annotated video file that was created most recently. Additionally or alternatively, the system may provide query output requesting additional input from the user in order to better identify the most relevant annotated video file. For example, if the initial audio input provided by the user does not lead to a match to at least one annotated video file, the system may ask the user to provide more info associated with their problem-solving query and/or provide that info in a clearer manner (e.g., providing the input slower, providing the input with greater enunciation, etc.).

The annotated video file may be used by the system to generate a state transition graph. The state transition graph may be a decision tree that identifies different states and attributes of the object and how each state is achieved from a previous state. For example, the decision tree may have a node that identifies a current state of an object and then identify different states that can be attained from the current state and what actions are required for traversing from the current node to a subsequent node. Using the working example, one node may be that the Internet is inaccessible.

Another node may be that the Internet is accessible. The decision tree may then have intervening nodes that identify different actions that may lead from inaccessible Internet to accessible Internet. The nodes of the decision tree may also identify specific states of parts of the object (e.g., status of visual indicators, screen state, object location, etc.).

At 104, the system may determine a state of the object and a location in the identified annotated video file that corresponds to the state. In the context of this application, a state of the object may refer to at least one of: an operability state (e.g., a broken state, a functional state, etc.), a specific situational state (e.g., a device's antenna is broken, a washing machine door is jammed, etc.) a mode state (e.g., airplane mode, silent mode, etc.), a completion state (e.g., thirty percent complete, seventy percent complete, etc.), and the like. In the context of this application, a location in the annotated video file may refer to a time point in the video file (e.g., 2 minutes, 5 seconds, etc.), a frame in the annotated video file (e.g., a frame comprising annotations related to the problem-solving input, etc.), and the like. For ease of readability, the annotated video file will be referred to as being accessed. However, it should be understood by one skilled in the art that the annotated video file itself may be accessed, the state graph or decision tree associated with the annotated video file may be accessed, or a combination thereof. In other words, the system does not only have to access or compare the object state to the video frames. Rather, the system may compare the object state to the state graph or decision tree to determine a current state and the next actions.

The system may determine the state of the object by comparing the parsed audio input to annotations in an annotated video file to determine a match between at least one of the annotations and a portion of the parsed audio input. As an example use case, a user may provide the audible query "My washing machine is not working and there are two blue blinking lights on the front. What do I do?" The system may initially identify an annotated video file corresponding to, for example, fixing a washing machine. The system may then identify a match between one or more of the parsed terms and annotations in the video file. For instance, the system may identify a match between "two blue blinking lights" and an annotation in the video file that mentions two or more blue-colored blinking lights. The annotation may comprise further information that associates the two blue blinking lights with a clog in the washing machine. From this information, the system may determine that a device state corresponds to a broken state where the washing machine is clogged, for example, by accessing the state graph or decision tree.

The system may determine the location in the annotated video file by identifying a frame, or a time point, in the annotated video file that corresponds to the annotation matched to a portion of the parsed audio input. Using the aforementioned example, the system may identify that the determined location in the annotated video file corresponding to two or more blue-colored blinking lights may correspond to frame 150 of 500 and/or time point 2 minutes and 30 seconds of the annotated video file.

Responsive to not determining, at 104, a state of the object and a location in the annotated video file corresponding to the object state, the system may, at 105, request additional input from the user. The system may thereafter determine the state of the object from the additional input from the user describing the object state. For example, a user whose gaming console is broken may provide the input "my gaming console is not working and the lights on it are blinking." Although the system may identify an annotated video file corresponding to fixing broken gaming consoles, the system may not be able to immediately identify the precise state of the object and/or the relevant section in the annotated video file. Therefore, the system may provide a request for additional user input that may provide a better indication regarding the object state. For instance, the system may provide one or more of the following query outputs: "which lights are blinking?", "how many lights are blinking?", "what pattern are the lights blinking in?", and the like.

Responsive to determining, at 104, a state of the object and a location in the annotated video file corresponding to the object state, the system may, at 106, provide instructional output related to the problem-solving query based on the location in the annotated video file. The instructional output may correspond to output associated with steps to resolve the problem-solving query (e.g., steps to fix a broken device, steps to complete the construction of an object, etc.). For example, the virtual assistant may access the state graph and identify how to traverse from the current state of the object to the desired state of the object using the state graph to identify the action attributes and the expected state of the object based upon performance of that action.

The instructional output may comprise at least one query provided by the virtual assistant, which may be followed by at least one responsive input provided by the user. The system may determine a new state of the object based upon this type of conversational back and forth. As an example use case, a user may have accidently enabled airplane mode on their phone and would like to disable it. After identifying a relevant annotated video and a location in the annotated video corresponding to a user query to disable airplane mode, the virtual assistant may provide the instructional output "click on settings icon home page". The system may thereafter wait for a confirmation input such as "okay, I clicked it". The system may then progress forward through the annotated video to the next frame, point, annotation, etc. in the video that may correspond to a new state of the object. In this instance, the new state of the object may be the updated user interface after the user has clicked on the settings icon in the home page.

To confirm that an object state of the object matches an object state in the instructional output (i.e., that the user is looking at the same user interface as is being currently played on the annotated video file), the system may provide additional output and wait to receive responsive user input. For example, the system may provide the output "Do you see an airplane symbol with a green button next to it?" If the user provides the responsive input "Yes, I see those things" the system may confirm to itself that the object state of the object matches an object state in the instructional output. By identifying new and successive object states of the at least one object, the system may be able to identify whether the object states of the object match the evolution of object states of the object as the annotated video progresses. Stated differently, the system may be able to identify that a user is correctly following the steps of the instructional output and that the object is behaving as expected.

The system may continue with this conversational back and forth until a resolution to the user's problem-solving query is obtained. The system may conclude the conversational session responsive to receiving a predetermined input from the user (e.g., "It worked, thanks!", etc.), responsive to identifying another predefined action by the user (e.g., the user hanging up the phone, etc.), responsive to reaching the end of the annotated video, and the like. Additionally, if the system determines that the device state no longer matches the expected device state, the system may request additional input from the user to determine the new current state of the object and the actions required to reach the desired object state.

Figure 2:
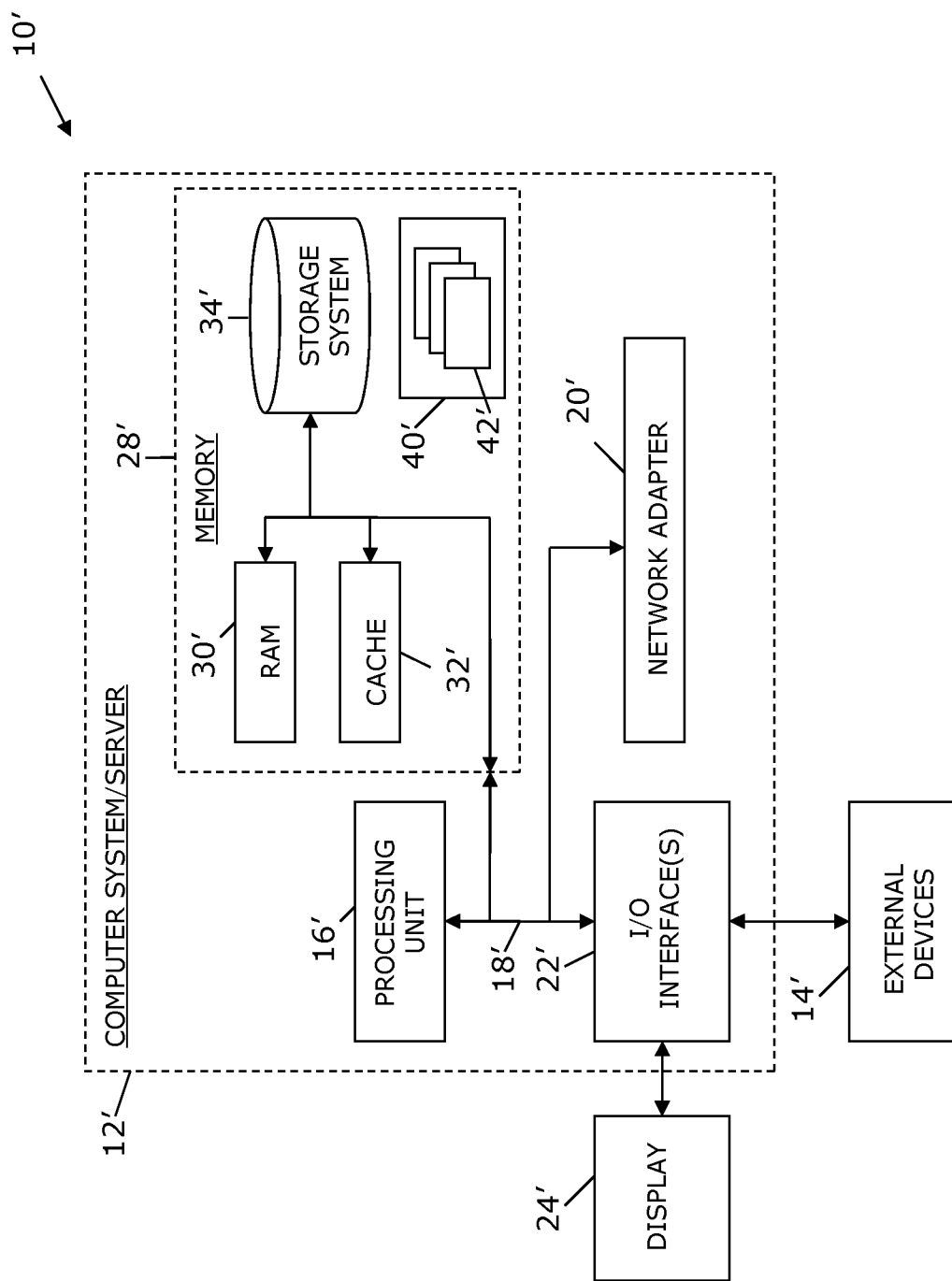
FIG. 2 illustrates a computer system.

As shown in FIG. 2, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
utilizing at least one processor to execute computer code that performs the steps of:
using an electronic device to engage in an interactive session between a user and a virtual assistant;
receiving, at the electronic device, audio input from the user, wherein the audio input comprises a problem-solving query corresponding to a request by the user for assistance in solving a problem related to at least one object;
parsing the audio input to identify the at least one object and a state of the at least one object, wherein the state of the at least one object corresponds to an inoperable state;
determining, from the parsed audio input, a location within an annotated video file corresponding to the state of the at least one object, wherein the determining comprises:
comparing terms in the parsed audio input to annotations of a plurality of video files stored in a video file database; and
identifying, responsive to determining a match between the terms in the parsed audio input and the annotations of at least one video file in the video file database, the annotated video file and the location within the annotated video file corresponding to the state of the at least one object;
wherein the annotated video file comprises annotations identifying objects and actions displayed in frames of the annotated video file; and
providing, to the user and based on the location in the annotated video file, instructional output to change the state of the at least one object from the inoperable state to an operability state.

2. The method of claim 1, wherein the electronic device corresponds to a voice-only device without a display screen.

3. The method of claim 1, wherein the determining the location in the annotated video file comprises identifying the frames of the annotated video file corresponding to the state of the at least one object identified in the parsed audio input.

4. The method of claim 1, wherein the identifying the state of the at least one object comprises providing query output requesting additional user input describing the state of the at least one object.

5. The method of claim 1, wherein the problem-solving query comprises a request from the user to provide instructional output related to an instruction manual for the at least one object.

6. The method of claim 1, wherein the instructional output comprises at least one query provided by the virtual assistant.

7. The method of claim 6, comprising determining a new state of the at least one object after receiving additional user input responsive to the at least one query.

8. The method of claim 1, wherein the problem-solving query comprises a request, from the user, to troubleshoot a problem related to an electronic device.

9. An apparatus, comprising:
   at least one processor; and
   a computer readable storage medium having computer readable program code embodied therewith and executable by the at least one processor, the computer readable program code comprising:
   computer readable program code configured to engage in an interactive session between a user and a virtual assistant;
   computer readable program code configured to receive audio input from the user, wherein the audio input comprises a problem-solving query corresponding to a request by the user for assistance in solving a problem related to at least one object;
   computer readable program code configured to parse the audio input to identify the at least one object and a state of the at least one object, wherein the state of the at least one object corresponds to an inoperable state;
   computer readable program code configured to determine, from the parsed audio input, location within an annotated video file corresponding to the state of the at least one object, wherein the determining comprises:
      comparing terms in the parsed audio input to annotations of a plurality of video files stored in a video file database; and
      identifying, responsive to determining a match between the terms in the parsed audio input and the annotations of at least one video file in the video file database, the annotated video file and the location within the annotated video file corresponding to the state of the at least one object;
      wherein the annotated video file comprises annotations identifying objects and actions displayed in frames of the annotated video file; and
   computer readable program code configured to provide, based on the location in the at least one annotated video file, instructional output to change the state of the at least one object from the inoperable state to an operability state.

10. A computer program product, comprising:
    a computer readable storage medium having computer readable program code embodied therewith and executable by the at least one processor, the computer readable program code comprising:
    computer readable program code configured to engage in an interactive session between a user and a virtual assistant;
    computer readable program code configured to receive audio input from the user, wherein the audio input comprises a problem-solving query corresponding to a request by the user for assistance in solving a problem related to at least one object;
    computer readable program code configured to parse the audio input to identify the at least one object and a state of the at least one object, wherein the state of the at least one object corresponds to an inoperable state;
    computer readable program code configured to determine, from the parsed audio input, location within an annotated video file corresponding to the state of the at least one object, wherein the determining comprises:
       comparing terms in the parsed audio input to annotations of a plurality of video files stored in a video file database; and
       identifying, responsive to determining a match between the terms in the parsed audio input and the annotations of at least one video file in the video file database, the annotated video file and the location within the annotated video file corresponding to the state of the at least one object;
       wherein the annotated video file comprises annotations identifying objects and actions displayed in frames of the annotated video file; and
    computer readable program code configured to provide, based on the location in the at least one annotated video file, instructional output to change the state of the at least one object from the inoperable state to an operability state.

11. The computer program product of claim 10, wherein the computer program product corresponds to a voice-only device without a display screen.

12. The computer program product of claim 10, wherein the determining the location in the annotated video file comprises identifying the frames of the annotated video file corresponding to the state of the at least one object identified in the the parsed audio input.

13. The computer program product of claim 10, wherein the identifying the state of the at least one object comprises providing query output requesting additional user input describing the state of the at least one object.

14. The computer program product of claim 10, wherein the instructional output comprises at least one query provided by the virtual assistant and wherein the computer program product comprises determining a new state of the at least one object after receiving additional user input responsive to the at least one query.

15. The computer program product of claim 10, wherein the problem-solving query comprises a request, from the user, to troubleshoot a problem related to an electronic device.

* * * * *